US012607320B2

(12) United States Patent
Chen

(10) Patent No.: US 12,607,320 B2
(45) Date of Patent: Apr. 21, 2026

(54) HIGH EFFICIENCY LIGHT GUIDE

(71) Applicant: Ford Global Technologies, LLC, Dearborn, MI (US)

(72) Inventor: Linsheng Chen, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 2 days.

(21) Appl. No.: 18/810,713

(22) Filed: Aug. 21, 2024

(65) Prior Publication Data

US 2026/0055866 A1 Feb. 26, 2026

(51) Int. Cl.

| | |
|---|---|
| ***F21S 43/237*** | (2018.01) |
| ***F21S 43/14*** | (2018.01) |
| ***F21S 43/20*** | (2018.01) |
| ***F21W 103/35*** | (2018.01) |

(52) U.S. Cl.

CPC ............. *F21S 43/237* (2018.01); *F21S 43/14* (2018.01); *F21S 43/26221* (2024.05); *F21S 43/26241* (2024.05); *F21W 2103/35* (2018.01)

(58) Field of Classification Search

CPC .... F21S 43/237; F21S 43/14; F21S 43/26221; F21S 43/26241

See application file for complete search history.

(56) References Cited

U.S. PATENT DOCUMENTS

| | | | | |
|---|---|---|---|---|
| 5,347,435 A | 9/1994 | Smith et al. | | |
| 6,356,394 B1 * | 3/2002 | Glienicke | B60Q 3/64 | 362/23.1 |
| 6,561,689 B1 * | 5/2003 | Kidd | B60Q 1/302 | 362/240 |
| 6,880,945 B2 * | 4/2005 | Knaack | F21S 41/24 | 362/615 |
| 7,025,482 B2 * | 4/2006 | Yamashita | B60K 35/40 | 362/348 |
| 8,016,441 B2 * | 9/2011 | Birman | G01D 11/28 | 362/559 |
| 10,309,585 B2 * | 6/2019 | Ansems | F21K 9/61 | |
| 2006/0171159 A1 * | 8/2006 | Anderlini | B60Q 1/302 | 362/511 |
| 2006/0291249 A1 * | 12/2006 | Tessnow | F21S 43/241 | 362/615 |
| 2008/0259627 A1 * | 10/2008 | Salter | H05B 45/325 | 315/308 |
| 2009/0027914 A1 | 1/2009 | Wu | | |
| 2018/0345846 A1 * | 12/2018 | Alisafaee | F21S 43/31 | |

FOREIGN PATENT DOCUMENTS

| | | |
|---|---|---|
| CN | 211918516 U | 11/2020 |
| WO | 2018069792 A1 | 10/2017 |

* cited by examiner

*Primary Examiner* — Bryon T Gyllstrom

(74) *Attorney, Agent, or Firm* — Vichit Chea; Carlson, Gaskey & Olds, P.C.

(57) ABSTRACT

A light guide comprises a center body portion that extends along a center axis and which has a first end associated with a light source and an opposite second end associated with a plurality of non-coplanar surfaces. A first leg portion extends away from the center body portion in a first direction and a second leg portion extends away from the center body portion in a second direction opposite of the first direction.

24 Claims, 2 Drawing Sheets

HIGH EFFICIENCY LIGHT GUIDE

TECHNICAL FIELD

This disclosure relates generally to a light guide arrangement, and relates more specifically to a light guide arrangement that facilitates lighting a narrow strip between two center high-mounted stop lamp (CHMSL) portions.

BACKGROUND

Vehicles include a center high-mounted stop lamp (CHMSL) that is mounted on a rear facing structure of the vehicle. The CHMSL provides an additional, centrally located stop lamp that enhances visibility.

SUMMARY

A light guide according to an exemplary aspect of the present disclosure includes, among other things: a center body portion extending along a center axis and having a first end associated with a light source and an opposite second end associated with a plurality of non-coplanar surfaces; and a first leg portion extending away from the center body portion in a first direction and a second leg portion extending away from the center body portion in a second direction opposite of the first direction.

In a further non-limiting embodiment of any light guide, the light source is centered on the center axis at the first end.

In a further non-limiting embodiment of any light guide, the plurality of non-coplanar surfaces comprise surfaces that each extend at an oblique angle relative to the center axis.

In a further non-limiting embodiment of any light guide, the plurality of non-coplanar surfaces comprise at least a first angled surface, a second angled surface, and a third angled surface.

In a further non-limiting embodiment of any light guide, the first angled surface faces the second angled surface.

In a further non-limiting embodiment of any light guide, the third angled surface faces a common side of the first angled surface and the second angled surface.

In a further non-limiting embodiment of any light guide, the first angled surface, the second angled surface, and the third angled surface comprise approximately 45 degree surfaces.

In a further non-limiting embodiment of any light guide, the first angled surface and the second angled surface include prisms and pillow lenses.

In a further non-limiting embodiment of any light guide, the third angled surface includes vertical flutes.

In a further non-limiting embodiment of any light guide, the center body portion comprises a cylindrical body that is narrower at the first end than at the opposite second end, and wherein edges of the first angled surface, the second angled surface, and the third angled surface converge together at the second end of the center body portion.

In a further non-limiting embodiment of any light guide, the first leg portion is associated with a rear side of the first angled surface and the second leg portion is associated with a rear side of the second angled surface.

In a further non-limiting embodiment of any light guide, the third angled surface is positioned between the first leg portion and the second leg portion.

In a further non-limiting embodiment of any light guide, the light source is associated with a CHMSL having two portions connected by a narrow strip, and wherein the light source is positioned on the narrow strip and aligned with the first end of the center body portion.

An assembly according to an exemplary aspect of the present disclosure includes, among other things: a CHMSL having a circuit board comprising two circuit board portions connected by a narrow strip; a light source positioned at the narrow strip; and a light guide having a center axis aligned with the light source, wherein the light guide comprises a plurality of non-coplanar surfaces to direct light to illuminate the two circuit board portions and the narrow strip.

In a further non-limiting embodiment of any assembly, the light guide comprises a cylindrical center body portion extending along the center axis and having a first end associated with the light source and an opposite end associated with the plurality of non-coplanar surfaces, and wherein the light guide includes a first leg portion extending away from the cylindrical center body portion in a first direction and a second leg portion extending away from the cylindrical center body portion in a second direction opposite of the first direction.

In a further non-limiting embodiment of any assembly, the plurality of non-coplanar surfaces comprise at least a first angled surface, a second angled surface, and a third angled surface that each face different directions and that each extend at an oblique angle relative to the center axis.

In a further non-limiting embodiment of any assembly, the light guide comprises a first wedge shaped body that includes the first angled surface and a second wedge shaped body that includes the second angled surface, and wherein the first leg portion is associated with a rear side of the first wedge shaped body and the second leg portion is associated with a rear side of the second wedge shaped body.

In a further non-limiting embodiment of any assembly, the light guide comprises an arcuate shaped body that includes the third angled surface, and wherein the arcuate shaped body is positioned on one side of the first wedge shaped body and the second wedge shaped body between the first leg portion and the second leg portion.

In a further non-limiting embodiment of any assembly, the light source comprises a single LED.

A method according to an exemplary aspect of the present disclosure includes, among other things: positioning a single LED on a narrow strip that connects two circuit board portions of a CHMSL; and aligning a light guide with the single LED, wherein the light guide comprises a plurality of non-coplanar surfaces that direct light to illuminate the two circuit board portions and the narrow strip.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
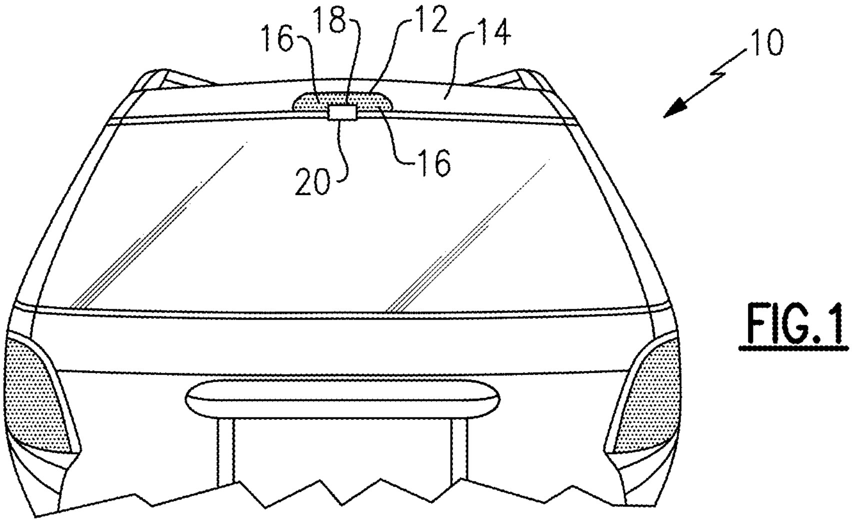
FIG. 1 illustrates a rear view of a vehicle with a CHMSL.

As shown in FIG. 1, this disclosure is directed to a vehicle 10 with a center high mounted stop lamp (CHMSL) 12 that is mounted on a rear facing structure 14 of the vehicle at a top center location. In implementations, the CHMSL 12 includes two light portions 16 that are connected by a narrow strip 18. In one example, a camera 20 or other type of sensor is positioned underneath the narrow strip 18.

In implementations, the CHMSL 12 comprises a single lamp with a continuously lit area such that the two light portions 16 and narrow strip 18 are illuminated as a single lamp. In other words, two separate CHMSL lamps may not be positioned on opposing sides of the camera 20. As such, the CHMSL 12 must have the narrow strip 18 be illuminated above the camera 20. The subject disclosure provides a light guide arrangement that allows for light from a light source 22 (FIG. 2) to fulfill the illumination of the narrow strip 18 between the two CHMSL light portions 16.

Figure 2:
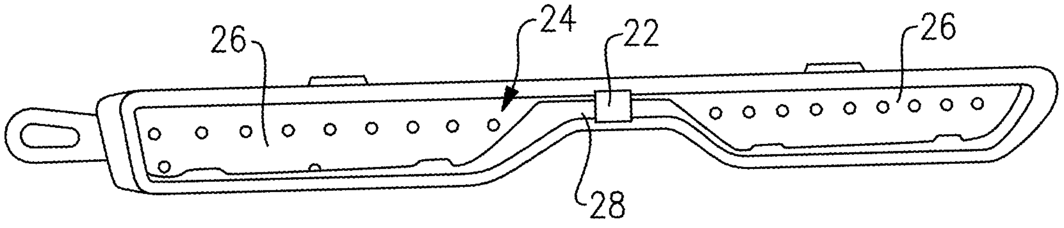
FIG. 2 is a front view of a CHMSL with two light portions that are connected by a narrow strip.
Figure 3:
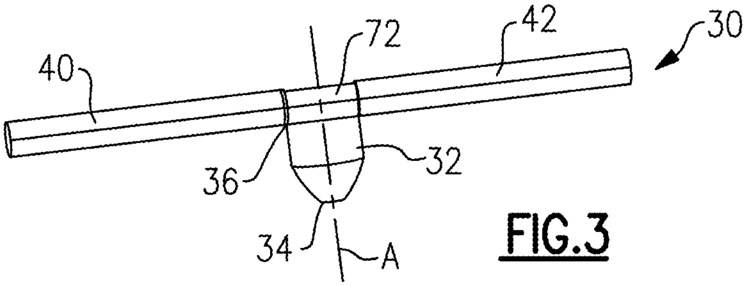
FIG. 3 is an exterior perspective view of a light guide for a LED located at the narrow strip.

FIG. 2 shows a printed circuit board (PCB) 24 for the CHMSL 12. In implementations, the PCB 24 includes two board portions 26 that are connected by a narrow board portion strip 28. In one example, the light source 22 is positioned at the narrow board portion strip 28. In one example, the light source 22 comprises a single LED that is mounted at this narrow strip center area of the PCB 24. This eliminates the need to add a separate PCB for this area.

FIGS. 3-7 show an example of a light guide 30 that is used to direct light from the light source 22 toward the two light portions 16 and illuminate the narrow strip 18 of the CHMSL 12. In implementations, the light guide 30 comprises a center body portion 32 that extends along a center axis A and which has a first end 34 associated with the light source 22 and an opposite second end 36 associated with a plurality of non-coplanar surfaces 38. In one example, a first leg portion 40 extends away from the center body portion 32 in a first direction and a second leg portion 42 extends away from the center body portion 32 in a second direction opposite of the first direction.

In one example, the light source 22 is centered on the center axis A at the first end 34.

In one example, the light source 22 comprises a single LED.

In one example, the plurality of non-coplanar surfaces 38 comprise surfaces that each extend at an oblique angle relative to the center axis A.

Figure 6:
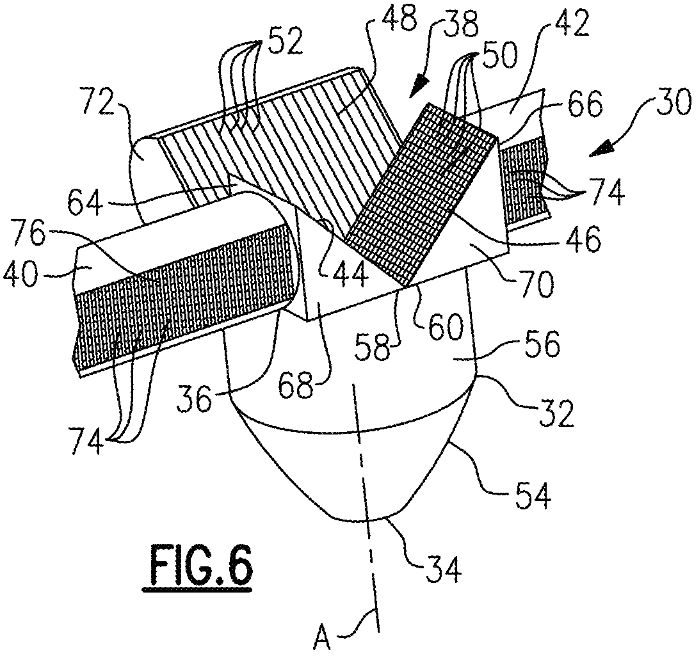
FIG. 6 is a magnified perspective view of a center portion of the light guide of FIG. 3.
Figure 7:
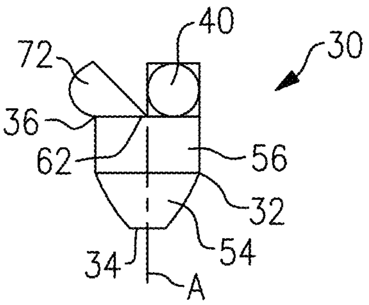
FIG. 7 is a side view of the light guide of FIG. 3.

In one example, the plurality of non-coplanar surfaces 38 comprise at least a first angled surface 44, a second angled surface 46, and a third angled surface 48 as best shown in FIG. 6.

In one example, the first angled surface 44 faces the second angled surface 46.

In one example, the third angled surface 48 faces a common side of the first angled surface 44 and the second angled surface 46.

In one example, the first angled surface 44, the second angled surface 46, and the third angled surface 48 comprise approximately 45 degree surfaces. For example, these surfaces each extend at a 45 degree angle relative to the center axis A.

In one example, the first angled surface 44, the second angled surface 46, and the third angled surface 48 each face different directions from each other.

In one example, the first angled surface 44 and the second angled surface 46 include prisms and pillow lenses 50.

In one example, the third angled surface 48 includes vertical flutes 52.

In one example, the center body portion 32 comprises a cylindrical body that is narrower at the first end 34 than at the opposite second end 36. In implementations, the center body portion 32 includes a first portion 54 comprising a tapered body and a second portion 56 that has a constant diameter. The first portion 54 continuously increases in diameter from the first end 34 to the second portion 56. The second portion 56 has a constant diameter and extends from the first portion 54 to the second end 36.

Figure 4:
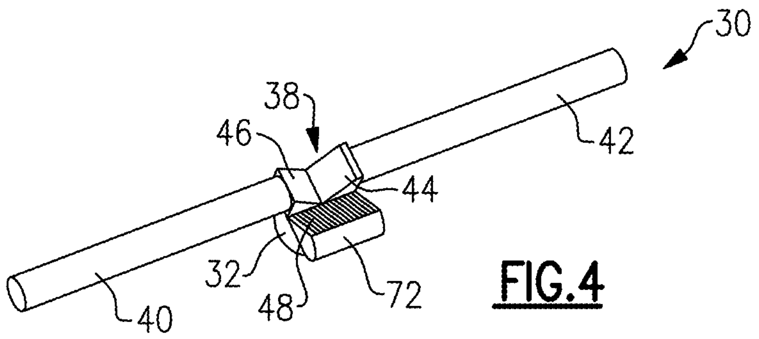
FIG. 4 is a top perspective view of the light guide of FIG. 3.
Figure 5:
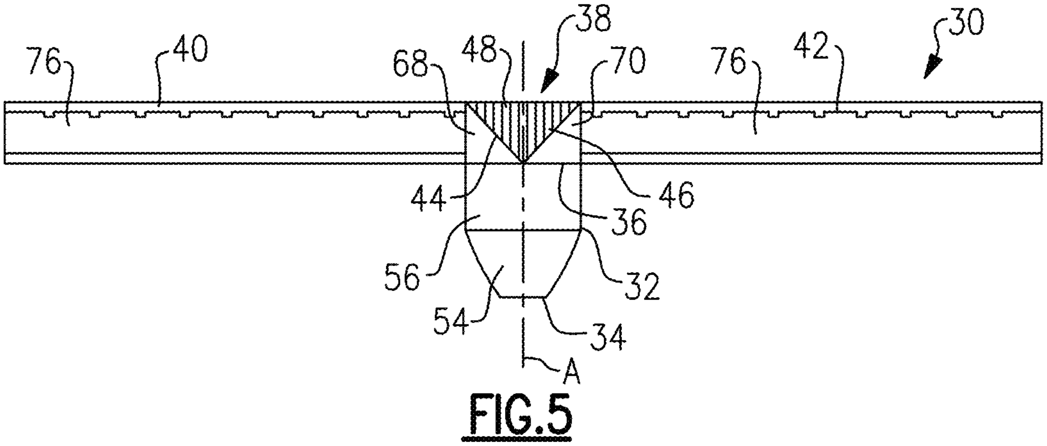
FIG. 5 is a vehicle side facing view of the light guide of FIG. 3.

In implementations, an edge 58 of the first angled surface 44, an edge 60 of the second angled surface 46, and an edge 62 of the third angled surface 48 converge together at the second end 36 of the center body portion 32 (see FIGS. 4 and 6).

In one example, the first leg portion 40 is associated with a rear side 64 of the first angled surface 44 and the second leg portion 42 is associated with a rear side 66 of the second angled surface 46.

In one example, the third angled surface 48 is positioned between the first leg portion 40 and the second leg portion 42. In implementations, the third angled surface 48 is positioned between ends of the first leg portion 40 and the second leg portion 42 that face each other.

In one example, the light source 22 is positioned at the narrow strip 18 of the CHMSL 12 and is aligned with the first end 34 of the center body portion 32. The plurality of non-coplanar surfaces 38 of the light guide 30 then direct light toward the two portions 16 and illuminate the narrow strip 18 of the CHMSL 12.

In implementations, the light guide 30 comprises a first wedge shaped body 68 that includes the first angled surface 44 and a second wedge shaped body 70 that includes the second angled surface 46. The first leg portion 40 is associated with the rear side 64 of the first wedge shaped body 68 and the second leg portion is associated with the rear side 66 of the second wedge shaped body 70.

In implementations, the light guide comprises an arcuate shaped body 72 that includes the third angled surface 48. The arcuate shaped body 72 is positioned on one side of the first wedge shaped body 68 and the second wedge shaped body 70, and between the first leg portion 40 and the second leg portion 42.

In one example, each of the leg portions 40, 42 include prisms 74 on at least one surface 76.

In one example, the leg portions 40, 42 comprise cylindrical bodies and the surface 76 with the prisms 74 comprises a planar surface. In one example, the planar surface faces the same direction as the third angled surface 48.

In implementations, the LED light source 22 is placed at a bottom of the center body portion 32 along the axis A. All light from the LED will be collected and collimated by collimator light guide 30. Collimated light will travel along a straight light guide path, and when the light exits the light guide 30, the light will strike on the three angled surfaces 44,46, 48. In one example, the surfaces are angled at 45° so the collimated light will be bent 45°.

In implementations, the third angled surface 48 has vertical flutes 52, which helps collimated light to spread in left and right directions, e.g., in laterally opposing directions.

In implementations, the first and second angled surfaces 46, 48 have prism and pillow lenses 50 to help collimated light to bend 45° and to then couple into two light guides legs with certain light distribution such as a Gaussian distribution, for example. This type of light distribution will help light propagate and extract from the light guide to provide a uniform illuminated appearance.

In one example, the prism angle used to extract light from light guide 30 should be kept 45°. As the prism is kept at 45°, the light can be extracted by the prisms and emitted in another surface.

In one example, an end of light guide 30 may add pad print or high reflectivity film.

In one example, when the light propagates along the light guide 30 to the end, it will be reflected back. The bounced back light can reach the light entry area and provide uniform look for whole light guide.

In implementations, by configuring the light guide in this manner, light from single LED can turn 90°. Further, it can illuminate quite a large light guide with high collection efficiency, e.g., almost 100% light from the LED will be collected by the collimator light guide, and the light then enters a 45° surface, becoming a total internal reflection (TIR).

The subject disclosure provides for several advantages. For example, only one LED is used to provide light for three optical components. Further, it has a high efficiency as light from the LED is 100% collected by LED collimator, and then the collimated light is bent 45° by three different 45° angled surfaces, and then enters two parallel light guide leg portions and one light blade. The vertical flutes and pillow lens on the 45° angled surfaces help to blend light and couple into the light guide.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A light guide, comprising:

a center body portion extending along a center axis and having a first end associated with a light source and an opposite second end associated with a plurality of non-coplanar surfaces; and a first leg portion extending away from the center body portion in a first direction and a second leg portion extending away from the center body portion in a second direction opposite of the first direction; and wherein the first leg portion and the second leg portion comprise straight cylindrical bodies that extend in a direction perpendicular to the center axis and are longer than the center body portion.

2. The light guide of claim 1, wherein the light source is centered on the center axis at the first end.

3. The light guide of claim 1, wherein the plurality of non-coplanar surfaces comprise surfaces that each extend at an oblique angle relative to the center axis.

4. The light guide of claim 3, wherein the plurality of non-coplanar surfaces comprise at least a first angled surface, a second angled surface, and a third angled surface.

5. The light guide of claim 4, wherein the first angled surface faces the second angled surface.

6. The light guide of claim 4, wherein the first angled surface, the second angled surface, and the third angled surface comprise approximately 45 degree surfaces.

7. The light guide of claim 4, wherein the first leg portion is associated with a rear side of the first angled surface and the second leg portion is associated with a rear side of the second angled surface.

8. The light guide of claim 1, wherein the light source is associated with a CHMSL having two portions that have a first width and that are connected to each other by a narrow strip having a second width less than the first width, and wherein the light source is positioned on the narrow strip and aligned with the first end of the center body portion.

9. The light guide of claim 1, wherein the straight cylindrical bodies each have a planar surface portion with prisms.

10. A light guide, comprising:

a center body portion extending along a center axis and having a first end associated with a light source and an opposite second end associated with a plurality of non-coplanar surfaces;

a first leg portion extending away from the center body portion in a first direction and a second leg portion extending away from the center body portion in a second direction opposite of the first direction;

wherein the plurality of non-coplanar surfaces comprise surfaces that each extend at an oblique angle relative to the center axis;

wherein the plurality of non-coplanar surfaces comprise at least a first angled surface, a second angled surface, and a third angled surface;

wherein the first angled surface faces the second angled surface; and wherein the third angled surface faces a common side of the first angled surface and the second angled surface.

11. A light guide, comprising:

a center body portion extending along a center axis and having a first end associated with a light source and an opposite second end associated with a plurality of non-coplanar surfaces;

a first leg portion extending away from the center body portion in a first direction and a second leg portion extending away from the center body portion in a second direction opposite of the first direction;

wherein the plurality of non-coplanar surfaces comprise surfaces that each extend at an oblique angle relative to the center axis;

wherein the plurality of non-coplanar surfaces comprise at least a first angled surface, a second angled surface, and a third angled surface; and wherein the first angled surface and the second angled surface include prisms and pillow lenses.

12. The light guide of claim 11, wherein the third angled surface includes vertical flutes.

13. A light guide, comprising:

a center body portion extending along a center axis and having a first end associated with a light source and an opposite second end associated with a plurality of non-coplanar surfaces;

a first leg portion extending away from the center body portion in a first direction and a second leg portion extending away from the center body portion in a second direction opposite of the first direction;

wherein the plurality of non-coplanar surfaces comprise surfaces that each extend at an oblique angle relative to the center axis;

wherein the plurality of non-coplanar surfaces comprise at least a first angled surface, a second angled surface, and a third angled surface; and wherein the center body portion comprises a cylindrical body that is narrower at the first end than at the opposite second end, and wherein edges of the first angled surface, the second angled surface, and the third angled surface converge together at the second end of the center body portion.

14. A light guide, comprising:

a center body portion extending along a center axis and having a first end associated with a light source and an opposite second end associated with a plurality of non-coplanar surfaces;

a first leg portion extending away from the center body portion in a first direction and a second leg portion extending away from the center body portion in a second direction opposite of the first direction;

wherein the plurality of non-coplanar surfaces comprise surfaces that each extend at an oblique angle relative to the center axis;

wherein the plurality of non-coplanar surfaces comprise at least a first angled surface, a second angled surface, and a third angled surface;

wherein the first leg portion is associated with a rear side of the first angled surface and the second leg portion is associated with a rear side of the second angled surface; and wherein the third angled surface is positioned between the first leg portion and the second leg portion.

15. An assembly comprising:

a CHMSL having a circuit board comprising two circuit board portions connected by a narrow strip;

a light source positioned at the narrow strip;

a light guide having a center axis aligned with the light source, wherein the light guide comprises a plurality of non-coplanar surfaces to direct light to illuminate the two circuit board portions and the narrow strip; and wherein the plurality of non-coplanar surfaces comprise at least a first angled planar surface on a first wedge shaped body, a second angled planar surface on a second wedge shaped body, and a third angled planar surface that each face different directions and that each extend at an oblique angle relative to the center axis.

16. The assembly of claim 15, wherein the light guide comprises a cylindrical center body portion extending along the center axis and having a first end associated with the light source and an opposite end associated with the plurality of non-coplanar surfaces, and wherein the light guide includes a first leg portion extending away from the cylindrical center body portion in a first direction and a second leg portion extending away from the cylindrical center body portion in a second direction opposite of the first direction.

17. The assembly of claim 16, wherein the plurality of non-coplanar surfaces comprise at least a first angled surface, a second angled surface, and a third angled surface that each face different directions and that each extend at an oblique angle relative to the center axis.

18. The assembly of claim 15, wherein the light source comprises a single LED.

19. An assembly comprising:

a CHMSL having a circuit board comprising two circuit board portions connected by a narrow strip;

a light source positioned at the narrow strip;

a light guide having a center axis aligned with the light source, wherein the light guide comprises a plurality of non-coplanar surfaces to direct light to illuminate the two circuit board portions and the narrow strip;

wherein the light guide comprises a cylindrical center body portion extending along the center axis and having a first end associated with the light source and an opposite end associated with the plurality of non-coplanar surfaces;

wherein the light guide includes a first leg portion extending away from the cylindrical center body portion in a first direction and a second leg portion extending away from the cylindrical center body portion in a second direction opposite of the first direction;

wherein the plurality of non-coplanar surfaces comprise at least a first angled surface, a second angled surface, and a third angled surface that each face different directions and that each extend at an oblique angle relative to the center axis; and wherein the light guide comprises a first wedge shaped body that includes the first angled surface and a second wedge shaped body that includes the second angled surface, and wherein the first leg portion is associated with a rear side of the first wedge shaped body and the second leg portion is associated with a rear side of the second wedge shaped body.

20. The assembly of claim 19, wherein the light guide comprises an arcuate shaped body that includes the third angled surface, and wherein the arcuate shaped body is positioned on one side of the first wedge shaped body and the second wedge shaped body between the first leg portion and the second leg portion.

21. A method comprising:

positioning a single LED on a narrow strip that connects two circuit board portions of a CHMSL; and aligning a light guide with the single LED, wherein the light guide comprises a plurality of non-coplanar surfaces that direct light to illuminate the two circuit board portions and the narrow strip, and wherein the light guide comprises a center body portion extending along a center axis and having a first end associated with the single LED and an opposite second end associated with the plurality of non-coplanar surfaces, and wherein the plurality of non-coplanar surfaces comprise at least a first angled planar surface on a first wedge shaped body, a second angled planar surface on a second wedge shaped body, and a third angled planar surface that each face different directions and that each extend at an oblique angle relative to the center axis.

22. The method of claim 21, including a first leg portion extending away from the center body portion in a first direction and a second leg portion extending away from the center body portion in a second direction opposite of the first direction, and wherein the first leg portion and the second leg portion comprise straight cylindrical bodies that extend in a direction perpendicular to the center axis and are longer than the center body portion.

23. An assembly comprising:

a CHMSL having a circuit board comprising two circuit board portions connected by a narrow strip;

a light source positioned at the narrow strip;

a light guide having a center axis aligned with the light source, wherein the light guide comprises a plurality of non-coplanar surfaces to direct light to illuminate the two circuit board portions and the narrow strip; and wherein the light guide comprises a center body portion and includes a first leg portion extending away from the center body portion in a first direction and a second leg portion extending away from the center body portion in a second direction opposite of the first direction, and wherein the first leg portion and the second leg portion comprise straight cylindrical bodies that extend in a direction perpendicular to the center axis and are longer than the center body portion.

24. A light guide, comprising:

a center body portion extending along a center axis and having a first end associated with a light source and an opposite second end associated with a plurality of non-coplanar surfaces;

a first leg portion extending away from the center body portion in a first direction and a second leg portion extending away from the center body portion in a second direction opposite of the first direction; and wherein the plurality of non-coplanar surfaces comprise at least a first angled planar surface on a first wedge shaped body, a second angled planar surface on a second wedge shaped body, and a third angled planar surface that each face different directions and that each extend at an oblique angle relative to the center axis.

* * * * *